United States Patent [19]

Davis

[11] 3,889,363

[45] June 17, 1975

[54] METHOD OF MAKING PRINTED CIRCUIT BOARDS

[76] Inventor: Richard P. Davis, Sanbornton, N.H. 03269

[22] Filed: Jan. 10, 1973

[21] Appl. No.: 322,463

Related U.S. Application Data

[63] Continuation of Ser. No. 115,408, Feb. 16, 1971, abandoned.

[52] U.S. Cl. .................... 29/625; 29/628; 156/150; 156/233; 174/68.5; 264/81; 264/104; 264/255; 264/265; 264/272; 317/101 B

[51] Int. Cl. ............................................ H05k 3/02

[58] Field of Search ........ 29/625, 628; 264/81, 104, 264/255, 265, 272; 156/150, 500, 232, 233; 174/68.5; 425/176, 177, 218, 436, 438; 317/101 R, 101 B, 101 CE

[56] References Cited

UNITED STATES PATENTS

| | | | |
|---|---|---|---|
| 2,861,911 | 11/1958 | Martin et al. | 264/81 X |
| 3,013,913 | 12/1961 | Croop et al. | 264/104 X |
| 3,077,658 | 2/1963 | Wharton | 264/265 X |
| 3,085,295 | 4/1963 | Pizzino et al. | 264/255 |
| 3,181,986 | 5/1965 | Pritikin | 156/233 |
| 3,324,014 | 6/1967 | Modjeska | 156/150 X |
| 3,388,464 | 6/1968 | Pretty | 264/272 X |
| 3,430,338 | 3/1969 | Flaherty | 264/272 X |
| 3,436,451 | 4/1969 | Wasser | 29/627 UX |
| 3,536,800 | 10/1970 | Hubbard | 264/104 |
| 3,552,004 | 1/1971 | Hagelbarger et al. | 264/255 |

*Primary Examiner*—C. W. Lanham
*Assistant Examiner*—Joseph A. Walkowski

[57] ABSTRACT

A method of making printed circuit boards having a circuit pattern of conductive material on either or both faces and conductive pins leading from one face to the other. A conductive layer having a circuit pattern is placed in a mold, and the insulating plastic which forms the substrate of the board is molded to the layer. In one example, the pattern is in the form of indented portions in a continous layer of conductive material, and the excess conductive material is ground off after the board is molded. In another example, the conductive pattern is deposited on the face of a mold prior to molding the board. Conductive through holes are formed by coating pine in the mold, before molding, or conductive pins are inserted into the mold and remain in the finished board.

9 Claims, 12 Drawing Figures

Inventor:
Richard P. Davis,
by Thomson & Mross
Attorneys

PATENTED JUN 17 1975 3,889,363

SHEET 2

Inventor:
Richard P. Davis,
by Thomson & Mrose
Attorneys

Inventor:
Richard P. Davis,
by Thomson & Mross
Attorneys

METHOD OF MAKING PRINTED CIRCUIT BOARDS

REFERENCE TO RELATED APPLICATIONS

This application is a continuation of U.S. application Ser. No. 115,408, filed Feb. 16, 1971, and now abandoned.

This invention relates to the manufacture of circuit boards of the type generally referred to as "printed," because their production by customary methods involves printing techniques.

BACKGROUND OF THE INVENTION

A typical way of making a printed circuit board is to plate or bond copper onto a board of insulating material, place a pattern of etch resistant material on the copper layer, by photoengraving or printing, and etch away the background copper to leave only the desired circuit pattern. This may be done on either or both faces of the board. To connect the two faces together, for example for mounting electrical components, holes are drilled through the board and plated with copper, and conductor pins are soldered into the holes. These operations are time consuming and require special tooling to insure alignment of the through holes with the printed circuit. In a board with numerous through connections, the holes may be so close together that they must be drilled in several operations. This adds to the cost of production and tooling, and increases the danger of error and damage to the board by handling.

The principal object of this invention is to provide a method of making circuit boards which involves a minimum of operation, thus reducing tooling and labor costs, which insures accuracy and uniformity in the placement of the through connections, and which minimizes handling between operation. Other objects, advantages, and novel features will be apparent from the following description.

SUMMARY

According to the method here described, the circuit pattern is formed first, and the insulating substrate is subsequently molded to the pattern. One way of performing the method is to deposit or form a layer of low melting point material onto the surface of a mold cavity having raised areas in the regions where the circuit pattern is to be formed. The mold has studs, which are likewise coated with low melting point material, which may be, for example, solder or tin. A copper layer is then deposited on the mold surface and studs. The mold is closed and the plastic material which is to form the insulating substrate, or body of the board is injected and curved. The layer of low melting point material is melted, either by the heat of the plastic itself or by heating the mold, and the part is removed. The part has indented portions where the circuit pattern is to be formed, and copper coated through holes. The surfaces of the board are then ground off to leave copper in the circuit pattern and through holes only. Connector pins, or the leads of electrical components, may then be inserted into the holes and soldered.

Another way of performing the method is to use a controlled deposit system, such as spattering through a screen, to deposit the low melting point material and the copper in the desired pattern on the interior of a mold. Copper tubes for making the conductive through holes, or copper connector pins are inserted into the mold, and remain in the board when it is molded.

End contacts for connecting the board to other circuits may be inserted in the mold and connected the circuit pattern by conductive through holes or pins.

DESCRIPTION OF THE PREFERRED EMBODIMENT

EXAMPLE I

Figure 1:
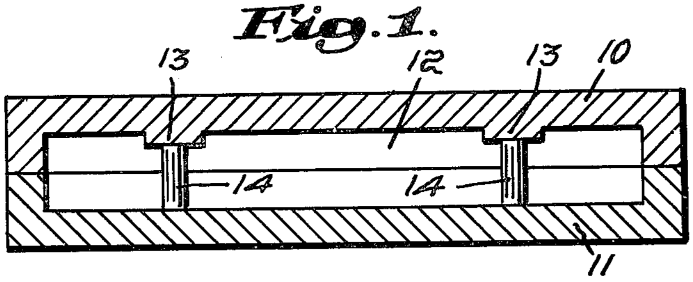
FIG. 1 is a cross-section of a typical mold used to produce a circuit board according to one manner of practising the invention.

The mold used for forming the board consists of upper and lower sections 10 and 11, which, when brought together, define a mold cavity 12. The upper section has raised portions 13 which may be arranged in any pattern along the interior surface of the cavity, according to the pattern of the circuit desired on the finished board. At various points, the upper section has bosses 14, in the positions where the through holes for the connector pins are required by the design of the particular circuit. When the mold is closed, bosses 14 engage, or may extend into or through, the wall of the opposite section 11 of the mold. It is understood that, to produce a board having circuits on both faces, section 11 may also have raised portions corresponding to the circuit pattern. Suitable provisions, not shown, may be made for injecting plastic into the cavity, evacuating the cavity, and heating and cooling the mold.

Figure 2:
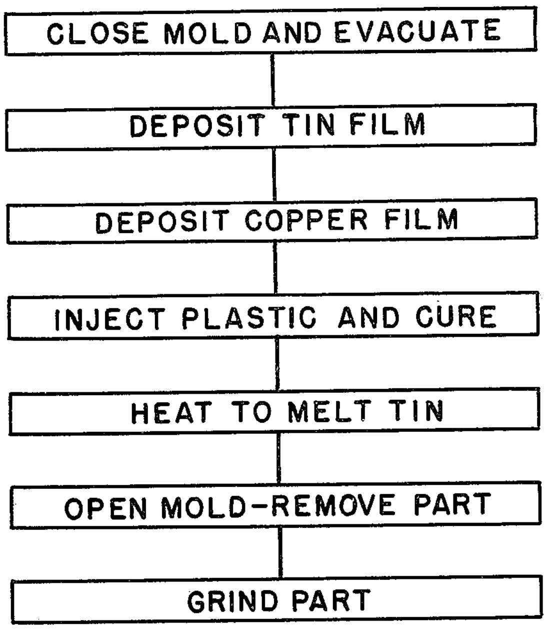
FIG. 2 is a flow chart illustrating schematically the steps for producing a circuit board from the mold of FIG. 1.

To make a board according to the process diagrammatically illustrated in FIG. 2, the mold is first closed and the cavity evacuated. A low melting point conductive metal, such as tin or solder, is vacuum deposited on the entire inner surface of the cavity, covering the exposed surfaces of bosses 14 as well as the walls of the cavity. A second coating of conductive metal of higher melting point than the first coating, such as copper, is then deposited over the entire inner surface of the cavity in a similar manner.

A suitable plastic insulating material is injected into the mold and curved. The mold is heated to a temperature above the melting point of the first coating but below that of the second coating. The heat given off by the plastic material itself may be sufficient to accomplish this, or the mold may be heated by any suitable means. The mold is opened and the partly finished board withdrawn. The liquified first coating acts as a mold release to facilitate removal of the part.

Figure 3:
FIG. 3 is a cross-section of a board as it is removed from the mold.
Figure 4:
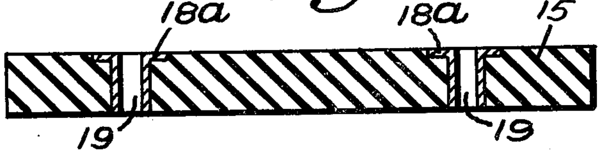
FIG. 4 is a cross-section of a completed board.

As shown in FIG. 3, the board as it comes from the mold consists of an insulating body or substrate 15, with indented portions 16 corresponding to the raised pattern on the surface of the mold, and through holes 17 in the positions of the bosses. All exposed surfaces of the board are coated with a layer 18 of copper. The tin film, which is thin, is largely dissipated or fused with copper. To finish the board, the copper layer is ground off the top, bottom, and edge surfaces, leaving the board with the circuit pattern 18a in the indented portions, and copper lined through holes 19, as shown in FIG. 4. Connector pins may then be inserted and soldered into the through holes. The residue of tin an the copper coating eliminates the need for pre-tinning. The board is then ready for mounting electrical components in the usual manner.

Figure 5:
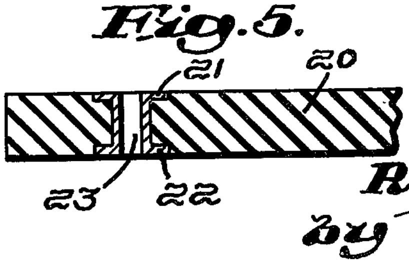
FIG. 5 is a fragmentary cross-section of a board having circuit patterns on both faces.

A circuit board such as that shown in FIG. 5 may be formed in a similar manner in a mold having raised circuit patterns on both sections. The finished board has an insulating body 20 and circuit patterns 21 and 22 on both faces, with copper lined through holes 23.

EXAMPLE II

Figures 6, 7, 8:
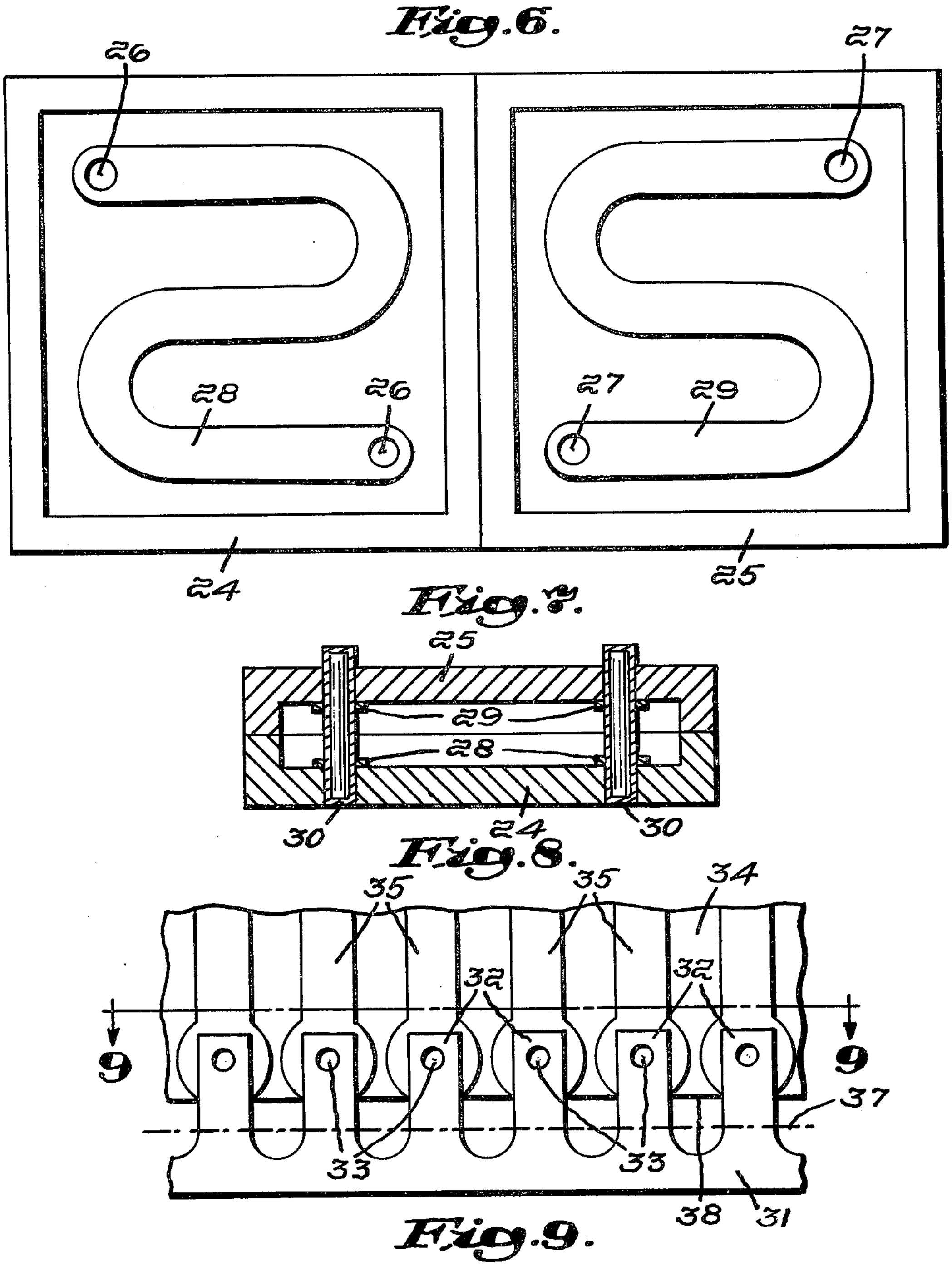
FIG. 6 is a plan view of an open mold used to produce a circuit board according to another manner of practising the invention.
FIG. 7 is a cross-section of the mold of FIG. 6 closed, ready for injection of the insulating plastic material.
FIG. 8 is a fragmentary plan view of a mold with a strip of end contacts in place, ready for production of a board.

A mold such as that illustrated in FIG. 6, consisting of two sections 24 and 25, is used. The mold sections have through holes 26 and 27. The low and high melting point coatings are placed on the interiors of the mold sections in the form of patterns 28 and 29. This may be done, for example, by placing the sections of the mold in a vacuum and spattering with an electron gun with controlled motion or through a mask. The mold is closed, and pre-tinned copper pins 30 inserted through the holes. The plastic insulating material is injected and cured, and the mold is heated to melt the low melting point coating as in the previous example. The part, when removed from the mold, is a finished board, with the circuit patterns 28 and 29 embedded in the surfaces, and the connector pins 30 in place.

INSERTION OF END CONTACTS

Figure 9:
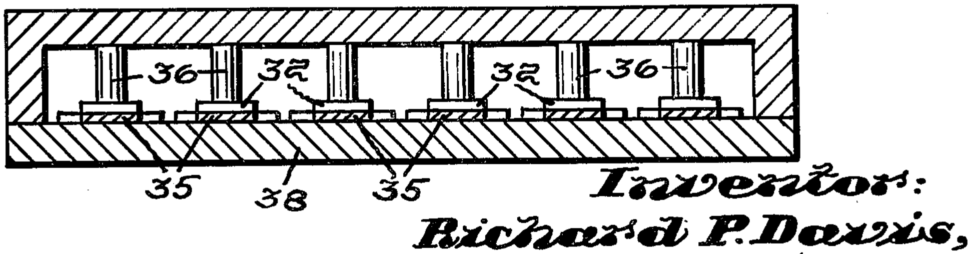
FIG. 9 is a view taken along line 9—9 of FIG. 8.

End contacts may be molded into a board made by any of the methods here described, as illustrated in FIGS. 8 and 9. A continuous copper strip 31 having laterally projecting fingers 32 is laid along one edge of a mold section 34 having raised portions, or preformed circuit patterns 35. The fingers have holes 33, which accommodate bosses 36 for forming through holes in the board, or connector pins may be inserted in the mold. After the board is molded and removed from the mold, strip 31 is cut off along the dot and dash line 37. If any copper has been deposited along the edges of the board, as in Example I, in the regions 38 between the fingers, it can be shaved off in the same operation, when the strip is cut off.

EXAMPLE III

A preformed sheet consisting of a low melting point layer 40 and a copper layer 41 is laid over a mold section 42 having a raised circuit pattern 43, which the sheet is formed to receive. Copper tubes 44 are inserted in the mold in the positions where through holes are required in the board. The board is molded and removed. The excess copper is ground off the surface, or surfaces of the board, leaving only the cirduit pattern, and the tubes cut off flush with tthe finished surfaces of the board to form copper lined through holes.

Figure 10:
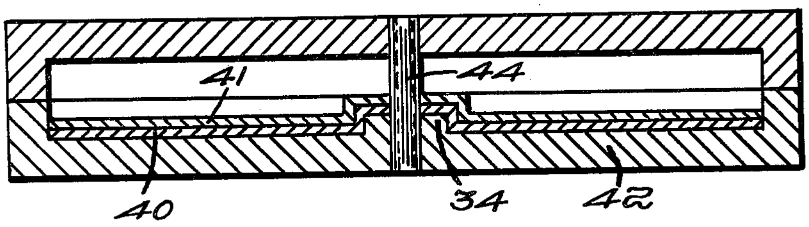
FIG. 10 is a cross-section of a portion of a mold with preformed sheet of conductive material in place, for making a board according to another manner of practising the invention.
Figure 11:
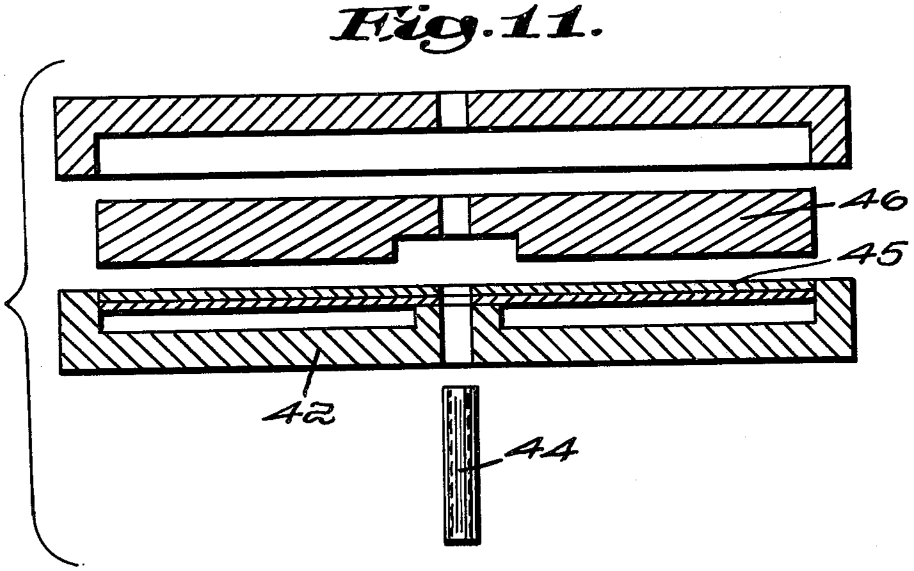
FIG. 11 is an exploded view of the parts used to produce a board according to another manner of practising the invention.

Instead of a preformed sheet, as illustrated in FIG. 10, a flat sheet 45 may be laid in the mold, as illustrated in FIG. 11. The copper tubes 44 are inserted, and the mold sections are brought together around a rigid plug 46, which fits the mold cavity, to form the sheet to the interior contour of the mold. Alternatively, the sheet may be conformed to the mold by injecting plastic into the mold to the right of the sheet under high enough pressure to form the sheet onto the contour of the mold.

The mold may be made of a material, such as teflon or polished steel, which will not bond to copper. In that case the coating of low melting point material may be omitted.

Figure 12:
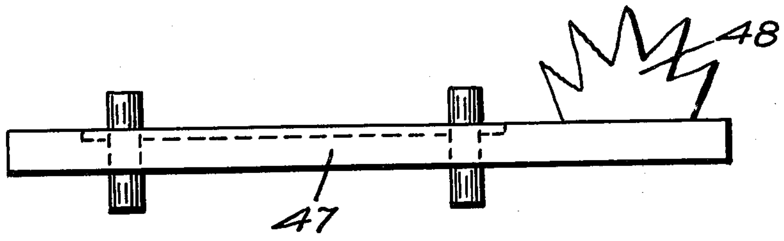
FIG. 12 is a side view of a board produced according to the invention with an integral heat sink.

A circuit board may be formed by any of the methods here described with other components integrally molded in, for example, FIG. 12 illustrates a circuit board 47 having an integrally molded heat sink 48. If the board is produced by the method of Example I, only the portion to the left of the heat sink is ground off to remove the excess copper. It is immaterial if the heat sink itself remains covered with copper, and in fact adds to its heat dissipating efficiency.

By the method here described, circuit boards having any desired pattern on one or both faces and any arrangement of through holes or connector pins can be produced in finished condition. The need for subsequent drilling and plating operations, and for tooling for aligning the board during these operations is eliminated. It is understood that the conductive coatings can be applied to the mold in various ways, for example by a wash, or by plating or printing techniques. The board itself may be formed of any of the plastic insulating materials ordinarily used as the body or substrate for printed circuit boards.

What is claimed is:

1. The method of making a printed circuit board in a mold having a cavity with oppositely disposed first and second walls which comprises; forming a first layer of solder-like material of low melting point on said first wall; forming a second layer of conductive material, of a type adapted to make a completed printed type circuit, on said first layer said layers being formed in a desired circuit pattern limited to selected portions of said first wall; forming paths of said type of conductive material extending from said first wall to said second wall and connected to said pattern; molding insulating material in said cavity to form a board bonded to said circuit pattern and including said paths; and melting said layer of solder-like material to simultaneously release the board from the mold and bond with and thereby tin said conductive material.

2. A method of making a circuit board as described in claim 1, in which said layers are formed with indented portions defining said pattern, and which includes the further step of grinding the surface of the molded board to remove all but the indented portions of said layers.

3. A method of making a circuit board as described in claim 1, the mold having bosses extending from said first wall to said second wall, and said paths being formed by coating said bosses with said solder-like material and then with said conductive material, thereby forming conductive through holes in the finished board.

4. A method of making a circuit board as described in claim 1, said paths being formed by inserting conductive pins into the mold and incorporating the pins in the board during molding.

5. A method of making a circuit board as described in claim 1, said layers being formed by vacuum depositing said solder-like and conductive materials on the wall of a mold having raised portions corresponding to said pattern.

6. A method of making a circuit board as described in claim 1, said layers being formed by controlled deposit of said solder-like and conductive materials in said pattern.

7. A method of making a circuit board as described in claim 1, said layers being formed by pressing sheets of said solder-like and conductive materials to conform them to the wall of a mold having raised portions defining said pattern, and said paths being formed by inserting into the mold conductive pins coated with solder-like material which bonds with said sheets during molding.

8. A method of making a circuit board as described in claim 1, which includes inserting a conductive strip having fingers into said mold, connecting said fingers to said pattern, and separating said fingers from one another after the board is molded.

9. A method of making a circuit board as described in claim 1, which includes forming a layer of solder-like material and a layer of conductive material on said second wall in the same manner as on said first wall and bonding both layers of conductive material to the board during molding.

* * * * *